United States Patent Office 3,567,641
Patented Mar. 2, 1971

3,567,641
FERROMAGNETIC HIGHLY PERMEABLE MANGANESE-ZINC-FERRITE CORE WITH GREAT TIME-AND-THERMAL STABILITY OF THE INITIAL PERMEABILITY AND PROCESS FOR ITS FABRICATION
Erich Ross and Ingrid Hanke, Munich, Germany, assignors to Siemens Aktiengesellschaft, Munich, Germany
Filed July 3, 1967, Ser. No. 650,907
Claims priority, application Germany, July 1, 1966, S 104,579
Int. Cl. C04b 35/38
U.S. Cl. 252—62.59                        16 Claims

ABSTRACT OF THE DISCLOSURE

A ferromagnetic highly permeable manganese-zinc-ferrite with great time and thermal stability of the initial permeability, having more than about 49 mol percent iron oxide, an amount of $TiO_2$ and very small amounts of CaO, characterized by the following composition with respect to the initial oxide:

|  | Mol percent |
|---|---|
| $Fe_2O_3$ | 49–51.6 |
| $TiO_2$ | .8–3 |
| MnO | 26–30.5 |
| ZnO | 17–22 | and, in addition, CaO in the order of magnitude of 0.05–0.2% by weight, and the method of making the same comprising the steps of mixing the substantially pure initial oxides, pre-sintering the same, wet-grinding with the addition of $CaCO_3$ or CaO, pressing the same, sintering at 1100–1300° C. in a low oxygen atmosphere and cooling the same in a substantially pure nitrogen atmosphere.

---

The invention relates to a ferromagnetic highly permeable manganese-zinc-ferrite core utilizable ferromagnetic elements for electric coils, transformers, and the like, with excellent initial permeability as a result of great time and thermal stability, i.e. the initial permeability in the temperature range during usage has only a very small temperature dependence and even after a long period of storage deviates only insignificantly from the value previously measured. The invention relates furthermore to a method for producing such a manganese-zinc-ferrite core.

A high initial permeability of more than $\mu_a = 1000$ and small losses have been realized in known manner with manganese-zinc-ferrite, particularly if the $Fe_2O_3$ content in the original mixture amounts to more than 50 mol percent. The portion of iron oxide exceeding the amount of 50 mol percent $Fe_2O_3$ is converted during production, partially or completely, into the bivalent form FeO and built into the cubic spinel lattice as $FeO \cdot Fe_2O_3$. For example in German published application No. 1,054,002 is found a description which states that optimal Q factors cannot be achieved unless the sintered end product contains 49.7 to 50.6 mol percent $Fe_2O_3$ and 0.3 to 7.5 mol percent FeO. The manganese oxide portion in the original mixture amounts in this case 24 to 38 mol percent (calculated as MnO) and the rest consists substantially of zinc oxide. It is also known in the prior art that an optimal temperature stability of such ferrite cores can be achieved, if the original mixture containing 31 mol percent MnO and 53.6 mol percent $Fe_2O_3$. The initial permeability of such a core amounts to 2710 and the hysteresis losses relative to the initial permeability are respectively by tan $\delta/\mu_a = 1.1 \cdot 10^{-6}$ at 100 kHz.

In this connection, care should be taken that the amount of impurities does not exceed 0.2% by weight, measured with respect to the total mass. Furthermore other disturbing impurities, particularly titanium are characterized as disadvantageous. In all events, this material should only occur as traces in the ferrite.

It is further known that a small loss factor can be attained in manganese-zinc-ferrite by using, in the production of ferrite, in addition to small portions of calcium oxide in the order of magnitude from 0.05 to 0.5% by weight. Thus, an initial permeability of 1780 and a loss factor tan $\delta/\mu_a = 1.1 \cdot 10^{-6}$ relative to the initial permeability was reached at 100 kHz. Such a core was sintered for three hours at 1200° C. in a nitrogen atmosphere containing 7% by volume of oxygen. Before the sintering, the original mixture was thermally pretreated for one hour at 850° and only thereafter, i.e. between pretreatment and sintering, mixed with calcium carbonate and ground for two hours. The cooling after the sintering took place with a velocity of 100° C./h. However, the stability of such manganese-zinc-ferrite, having 53.3 mol percent $Fe_2O_3$ still leaves much to be desired.

Finally, the process is also known, wherein, in order to improve the loss factor of manganese-zinc-ferrite, in addition 0.05 to 0.3% by weight calcium oxide, there is added thereto very small portions of silicon oxide between 0.005 to 0.035% by weight. It has already been mentioned that in order to improve the temperature coefficient of the permeability, aluminum oxide, zinc oxide, and titanium oxide have been added in amount of approximately 0.5%. With an $Fe_2O_3$ content of 54 mol percent, a content of 35 mol percent MnO and the rest zinc oxide, a relative temperature coefficient of $TK/\mu_a = 0.8 \cdot 10^{-6}/°$ C. in a temperature range, during operation, between 0 to +40° C. was achieved, with hysteresis losses relative to the initial permeability of $h./\mu_2 = 0.25 \cdot 10^{-3}$ cm./ka. at 100 kHz.

The problem of the invention is to improve the temperature and time stability of the initial permeability of such manganese-zinc-ferrite cores having small losses at high initial permeability, i.e. that both the time instability and the temperature dependence of the initial permeability must be reduced.

The term "time instability" is intended to refer to the quality of the initial permeability to reduce its originally measured value, in the course of time due to aging phenomena. As a measure for this time instability the variation in permability of the ferromagnetic material is compared on the basis of a unit time decade, thus, for example, between one and ten hours, after thermal, magnetic or mechanical shock has been applied to the ferromagnetic material. Consequently, exposing the sample to be measured to a temperature of 60° C., for example, forms the foundation of the measuring process for determining the time instability. At this temperature, the sample to be tested is demagnetized in an alternating magnetic field. The first measurement for determining the initial permeability then follows, for example, one hour after the demagnetization and the second measurement ten hours after the demagnetization. The relative modification of the initial permeability measured is related to the original initial permeability and due to the decreasing charcteristic represents a negative value $-i_z/\mu_a$.

The thermal stability of the initial permeability is intended to mean the dependence of the initial permeability on the temperature of the ferromagnetic material. It is known that the initial permeability in the range of the Curie temperature drops to small values directly below the Curie temperature and subsequently assumes very high values, reaching a so-called primary permeability maximum, and from there drops more or less strongly with lower temperatures. Various ferrities also have one or more maxima at temperatures below the primary permeability maximum, and such other maxima are designated secondary maxima. The temperature coefficient of the permeability represents the relative permeability change with the temperature.

Generally, it is related to the initial permeability at 20° C. and indicated as $TK/\mu_a$. Thus, this value is representative of the steepness of the permeability temperature curve $\mu_a$ (T).

Through exhaustive fundamental research of the most varied basic compositions, additional materials, and manufacturing conditions, it was surprisingly determined that, contrary to prior teaching, considerable titanium oxide portions can lead to very important reductions of the thermal and time instability values, if certain basic manganese-zinc-ferrite are adhered to.

The invention comprises, therefore, a basic composition, having in particular, small portions of CaO namely:

51.5–53.5 mol percent $Fe_2O_3$ and $TiO_2$, of which 0.7–3.5 mol percent is $TiO_2$ and at least 49 to a maximum of 52.8 mol percent is $Fe_2O_3$,
26–30.5 mol percent is MnO,
17–22 mol percent is ZnO
and in addition, CaO is present in an amount of 0.05–0.2% by weight.

A particularly suitable composition of manganese-zinc-ferrite, is so composed that its $Fe_2O_3+TiO_2$ components are 52–53 mol percent with 0.7–2.0 mol percent titanium oxide. 28–30 mol percent of manganese oxide and 17.5–19 mol percent of zinc oxide are also present.

Thus, according to the invention, the composition range considered heretofore as optimally advantageous with respect to the loss properties and the temperature stability is so varied that $TiO_2$ is not present as an addition, but instead considerable $TiO_2$ portions are substituted for $Fe_2O_3$. That is, $TiO_2$ as an addition would increase the time instability, etc., due to the fact that the formation of FeO is increased in the sintering.

On the other hand, according to the invention, the time instability is very small and furthermore, the titanium content in such composition moves the secondary permeability maximum very far in the direction of low temperatures, so that even with relatively low iron concentrations of 50 to 51.5 mol percent $Fe_2O_3$ in the original mixture, secondary maxima still occur below 0° C. and the possibility is thereby created to achieve a very small temperature coefficient of the initial permeability over a very wide temperature range, particularly between −60° C. and +80° C. Heretofore, this has not been possible. The solution is furthermore very surprising.

An increase in the $TiO_2$ portion by 0.1 mol percent results in a shifting of the secondary permeability maximum by approximately −10° C. The utilization of such considerable titanium concentration also very favorably affects the smoothing of the permeability temperature curve. It is also surprising that despite these considerable amounts of $TiO_2$ the alternating field losses also are reduced, so that as a result of the combination according to the invention a manganese-zinc-ferrite core can be realized with relatively high initial permeability, small losses and insignificant temperature dependence of the magnetic properties over a wide range of application temperatures. Furthermore, the time instability values are extremely insignificant.

In a relatively very norrow composition range within the specified combination, very small alternating field and hysteresis losses, at high initial permeability, can be achieved, with small time instability and a very small temperature coefficient $$-0.1 \cdot 10^{-6}/°\text{ C.} \leq TK/\mu_a \leq 0.1 \cdot 10^{-6}/°\text{ C.}$$

between +10 and +60° C.

This is the case of an initial composition of 50.5–51.5 mol percent, particularly 51 to 51.3 mol percent $Fe_2O_3$, 28 to 30 mol percent MnO, 17.5 to 19.5 mol percent, 0.8 to 1.5, in particular 1 to 1.3 mol percent $TiO_2$ and a small calcium oxide content are employed. Otherwise if possible pure raw materials should be used. The silicon oxide concentration must thereby be small, that is only about .001% by weight. In this case, the ferrites can be sintered at high temperatures, so that the high initial permeability and the small temperature coefficient can be achieved without thereby creating a collective crystallization and resulting loss increase. Heretofore conventional highly permeable, low loss manganese-zinc-ferrite have, as is known in the prior art, a high iron concentration and, consequently, also a higher instability. The time instability is, for example, doubled when the iron constituents increase by approximately 0.5 mol percent. Ferrites with equally low iron concentration without $TiO_2$, on the other hand, always have a large positive temperature coefficient. Thus, the important thing is the common utilization of these two conditions in combination.

To increase the range of operating temperatures, in low temperature direction, particularly below 0° C., it is proposed in a further development of the invention to so select the composition within the specified range that it comprises 50.5 to 51.3 mol percent $Fe_2O_3$ and 1 to 3 mol percent $TiO_2$, particularly 1.5 to 2 mol percent $TiO_2$ for permeabilities in excess of 2000, and 2 to 3 mol percent $TiO_2$ for permeabilities around 1500, with 27.5 to 29.5 mol percent MnO and 17.5 to 19.5 mol percent ZnO being employed. Such wide-temperature-range ferrites (WTR ferrites) are, first and foremost, necessary for use in electrical appliances which are subject to large temperature fluctuations, for example in devices which are exposed to extreme climatic conditions, or particularly in spacecraft whose control and other equipment must perform reliably over wide fluctuations in temperature.

Sometimes it is also desirable to produce a ferromagnetic element in which the characteristic of the permeability temperature curve, though very small, is clearly positive. Such elements are employed with particular advantage as inductive elements of filters, by means of which the small and negative temperature coefficient is to be compensated by capacitive members. To solve this special problem, the invention in a further development thereof utilizes 51.2 to 52.0 mol percent $Fe_2O_3$, 0.7 to 1.0 $TiO_2$, 28 to 30.2 mol percent MnO and the rest zinc oxide, in addition to small calcium oxide amounts.

The production process according to the invention comprises the steps of mixing the above-mentioned original components, particularly without calcium oxide, pre-sintering the same for about an hour at about 700 to 900° C., particularly 800 to 850° C., thereafter wet-grinding while about 0.1% by weight calicum carbonate or a corresponding quantity of CaO is added, then pressing and sintering at 1100° to 1300° C. for one to four hours in a oxygen-low atmosphere and cooling in a predominately pure, inert atmosphere. To prevent separations of an ilmenite phase ($FeTiO_3$) in sintered cores when using the low sintering temperature around 1100° C., the already sintered core, is preferably sintered a second time at about the same temperature and under similar conditions.

The cooling preferably takes place relatively fast with a velocity of about 200 to 500° C./h., until temperatures below 900° C. are reached, then slower at about 100° C./h. until approximately 200° C.

In order to attain a small positive temperature coefficient, two hours of sintering should be performed preferably at temperatures between 1200 and 1260° C.

The invention will be explained in detail in the following, in connection with the drawings, in which:

FIG. 1 is a perspective view of a manganese-zinc-ferrite annular core which may serve as a ferromagnetic element for an electrical coil. For the sake of clarity, the coil winding is not illustrated but would be disposed around the ring-shaped core body;

FIG. 2 is a quaternary diagram in which the initial combination according to the invention is illustrated therein as a shaded area which designates the MnO-ZnO-$Fe_2O_3$-$TiO_2$ contents, from which it is apparent that the solution of the problem underlying the invention involves a relatively small area.

FIG. 3 is an enlarged cutaway portion of the quaternary diagram of FIG. 2, in which the heavily framed composition area in the lower left-hand portion of the diagram corresponds to the area according to the invention, while the smaller area outlines the preferred area. The basic compositions marked by points and designated by letters refer to illustrative embodiments which will be hereinafter explained in detail. The arrow pointing to the right and below corresponds to the amount of $TiO_2$ in mol percent.

FIGS. 4 and 6 illustrate the permeability-temperature characteristics of individual illustrative embodiments and FIGS. 5, 7 and 8 the magnetization loops of several ferrite cores.

In the following Table 1, the basic combinations as well as the most important properties of various Mn-Zn-ferrites, mixed and produced in according to the invention, are represented, which are likewise marked to correspond with the quaternary diagram of FIG. 3.

The loss factor $\tan \delta/\mu_a$ relative to the initial permeability is measured at 100 kHz., a measuring temperature of 20° C. and a controlling field strength of 1M oe., and the relative hysteresis loss factor $h./\mu_2$ at a measuring frequency of 20 kHz., the same measuring temperature, and a controlling field strength of from 5 to 25M oe. The instability with respect to time and the temperature coefficient are measured at a measuring frequency of 25 kHz., measuring the time instability value occurring between two and twenty hours after a magnetic shock taking place at about 60° C.

It will be apparent from Table 1 that very small temperature coefficients can be achieved over a wide temperature range, e.g. in a mixture comprising about 50.7 mol percent $Fe_2O_3$ and 1.7 mol percent $TiO_2$. Furthermore, the time instability is very small. By varying the sintering temperature in the direction of lower values the initial permeability of such a composition may be reduced from 3100 to 1250. Although the instability values undergo a certain deterioration as a result, they are nevertheless still very small and the losses are considerably reduced because such a ferrite core, according to the invention, corresponding to Example $A_{II}$ has a minimum of losses which is uniformly low over a very wide temperature range.

EXAMPLE A (a) $A_1$ (highly permeable)

The special problem here involved is to produce a highly permeable manganese-zinc-ferrite core with a temperature coefficient of less than $\pm 0.5/10^{-6}/°$ C. and of a small instability with respect to time of less than $1.5 \cdot 10^{-6}$ with relatively small losses.

For this purpose the following process is utilized: 52.4 mol percent $Fe_2O_3$ and $TiO_2$ is mixed with 28.6 mol percent MnO and 19.0 mol percent ZnO. Pure raw materials with an impurity content of less than 0.2% by weight are utilized, and the mixing is effected with distilled water in a ball mill for four hours. The substance is subsequently pretreated (preferritized) at 850° C. for one hour and then again wet ground. Sufficient calcium carbonate is added that the end product contains 0.05% by weight CaO. The annular cores, with an outer diameter of 18 mm., an inner diameter of 10 mm., and a core height of 5 mm. pressed with 1 t./cm.², are sintered for two hours at 1280° C. in an oxygen atmosphere containing about 5 vol. percent oxygen. The cooling takes place in pure nitrogen with a velocity of from 300 to 500° C./h.

Three initial compositions utilizing various $Fe_2O_3$ concentrations are illustrated in detail in Table II.

TABLE II

| | $Fe_2O_3$ + $TiO_2$ | MnO | $TiO_2$ | $\mu_a$ | $\tan \delta/\mu_a$ [$10^{-5}$] | $h/\mu_a^2$ [$10^{-3}$cm/kA] | $-i_z/\mu_a$ [$10^{-6}$] | $TK/\mu_a$ [$10^{-6}/°$ C.] | Temperature range |
|---|---|---|---|---|---|---|---|---|---|
| $A_0$ | 52.4 | 28.6 | 0 | 2,000 | 5 | 0.6 | 4 | >2 | −20/+80 |
| $A_1$ | 52.4 | 28.6 | 1.7 | 3,100 | 3.6 | 0.25 | 0.65 | </±0.3/ | −20/+80 |
| $A_2$ | 52.4 | 28.6 | 2.2 | 2,800 | 4 | 0.3 | 1.3 | </±0.4/ | −60/+80 |

FIG. 4 illustrates the $\mu$ (T) curve $A_1$ for the ferrite core $A_1$ of Table II. It will be apparent that in the temperature range from −10 to +80° C. the temperature coefficient is smaller than $\pm 0.3 \cdot 10^{-6}$ per degree centigrade.

The stability with respect to time amounts to 0.65. If, on the other hand, the addition of titanium oxide according to example $A_0$ is eliminated, not only are the initial permeability smaller and the losses greater, under identical production conditions, but first and foremost the temperature coefficient and the time instability values are considerably greater. If the titanium oxide concentration is increased to the value of 2.2 mol percent according to example $A_2$, the advantageous properties of core $A_1$ are substantially retained, the application range, however, being expanded until at −60° C. ($TK/\mu_a \leq 0.4 \cdot 10^{-6}/°$ C.).

(b) $A_{II}$ (low permeability ferrite)

The special problem here involved is to produce a manganese-zinc-ferrite with very small losses and with low instability values. In this case it is not absolutely necessary to achieve a very high initial permeability, so that a permeability in excess of 1000 is sufficient.

The following initial mixture is combined:

| | Mol percent |
|---|---|
| $Fe_2O_3$ | 50.7 |
| MnO | 28.6 |
| ZnO | 19.0 |
| $TiO_2$ | 1.7 |

The powder preparation takes place in the same manner as in Example $A_1$. In this case calcium carbonate also is added in a similar manner. In contrast to the illustrative embodiment $A_1$, however, sintering takes place at 1100 to 1130° C. for two hours in a nitrogen atmosphere, whose oxygen concentration lies between 0.2 and 1 vol. percent. Cooling occurs rapidly in a nitrogen atmosphere with less

TABLE I

| | $Fe_2O_3$ | MnO | $TiO_2$ | $\mu_a$ | $\tan \delta/\mu_a$ [$10^{-5}$] | $h/\mu_a^2$ [$10^{-3}$cm/kA] | $-i_z/\mu_a$ [$10^{-6}$] | $TK/\mu_a$ [$10^{-6}/°$ C.] | Temperature range |
|---|---|---|---|---|---|---|---|---|---|
| $A_I$ | 50.7 | 28.6 | 1.7 | 3,100 | 3.6 | 0.25 | 0.65 | /±0.3/ | −20/+80 |
| $A_{II}$ | 50.7 | 28.6 | 1.7 | 1,250 | 1.8 | 0.25 | 1.5 | 0.9 1.2 | +20/+60 −30/+20 |
| B | 51.2 | 28.1 | 1.5 | 2,400 | 2.5 | 0.5 | 1.8 | +0.1/+0.6 | −60/+60 |
| C | 50.1 | 28.4 | 2.9 | 1,350 | 3.4 | 0.4 | 1.8 | +0.55 | −30/+70 |
| D | 51.25 | 29.25 | 1.0 | 3,260 | 2.3 | 0.18 | 0.8 | ±0.06 | +10/+60 |
| E | 52.0 | 28.3 | 0.7 | 2,300 | 1.9 | 0.2 | 0.8 | 1 | +20/+60 |
| F | 51.6 | 30.2 | 1.0 | 1,700 | 1.3 | 0.15 | 4 | 0.75 | 0/+60 | than 0.1 vol. percent $O_2$ until 900° C. (with approximately 500°C./h.), and then with about 100° C./h. to 200° C.

The result is a ferrite, whose initial permeability is 1250 and whose other specific values are set forth in Table I. As in all examples presented, the end composition of this core is changed slightly, as during the grinding of the initial and preferritized materials in the ball mill a certain iron abrasion away takes place which is received in the mixture. Moreover, a very slight Zn evaporation can occur so that the end combination may have the following values:

| | Mol percent |
|---|---|
| $Fe_2O_3$ | 51.1 |
| MnO | 28.3 |
| ZnO | 18.8 |
| TiO | 1.7 | and 0.06% by weight CaO.

FIG. 5 illustrates the hysteresis loop of this material, from which it will be noted that such core has an isoperm character, the remanence induction amounting only to 25% of the saturation induction with the ascending and descending portions of the hysteresis loop extending substantially parallel. Such a hysteresis loop in ferrite cores of manganese-zinc-ferrite with an initial permeability of only about $\mu_a=1000$ had not heretofore been produced.

EXAMPLE B

The special problem here involved is to produce an invariably positive and small temperature coefficient of the initial permeability of less than $+0.6 \cdot 10^{-6}/°$ C. between $-60°$ C. and $+60°$ C., in which initial permeability must be as high as possible and the loss factor as well as the time instability as small as possible.

The following initial combination is combined and mixed:

| | Mol percent |
|---|---|
| $Fe_2O_3$ | 51.2 |
| ZnO | 19.2 |
| MnO | 28.1 |
| $TiO_2$ | 1.5 |

Care should be taken that the iron concentration is maintained as accurately as possible, as a variation of $+0.1$ mol percent $Fe_2O_3$ causes a displacement of the secondary permeability maximum by about $-10°$ C. The change of the $TiO_2$ portion by 0.1 mol percent likewise leads to such a displacement.

The pretreatment and the admixture of 0.1% by weight, $CaCO_3$ are effected as described in Example $A_1$. The sintering is effected between 1200 and 1230° C. in a flowing atmosphere, whose oxygen concentration of 20 vol. percent is reduced by less than 0.1 vol percent. The sintering time is two hours, wtih cooling rapidly taking place in pure nitrogen with less than 0.1 vol. percent oxygen, and with a velocity of from 400° to 500° C./h. until a temperature of 200° C. is reached.

The permeability temperature curve B thereof is illustrated in FIG. 6.

EXAMPLE C

The special problem here involved is to produce a ferrite with an initial permeability around 1280 and isoperm character, i.e. very slight losses and a constant and small temperature coefficient between $-30°$ C. and $+70°$ C.

To this end, the following initial composition is employed:

| | Mol percent |
|---|---|
| $Fe_2O_3$ and $TiO_2$ | 53.0 |
| MnO | 28.4 |
| ZnO | 18.6 |

The powder preparation again is effected as explained in the illustrative embodiment $A_1$, with sintering taking place at relatively low temperatures, namely at 1120° C. for one hour, in a low oxygen atmosphere having about 0.5 vol. percent oxygen. Cooling takes place at about 500° C. per hour until a temperature at 900° C. is reached, and at 100° C./h. until 200° C., in pure nitrogen (less than $-.1$ vol. percent oxygen).

Changes may be made within the scope and spirit of the appended claims which define what is believed to be new and desired to have protected by Letters Patent.

We claim:

1. Ferromagnetic highly permeable manganese-zinc-titanium ferrite with great time and thermal stability of the initial permeability, which is usable over a large temperature range for coils, transformers and the like and, except for a small CaO constituent, contain substantially no impurities, comprising the following composition with reference to the initial oxides:

| | Mol percent |
|---|---|
| $Fe_2O_3$ | 49–51.6 |
| $TiO_2$ | 0.8–3 |
| MnO | 26–30.5 |
| ZnO | 17–22 | plus 0.05 to 0.2% by weight of CaO.

2. A manganese-zinc-ferrite core according to claim 1, characterized by the following limiting values:

| | Mol percent |
|---|---|
| $Fe_2O_3$ | 50.5–51.5 |
| $TiO_2$ | 0.8–1.5 | and not more than 0.001% by weight $SiO_2$.

3. A manganese-zinc-ferrite core according to claim 2, characterized by the following limiting values:

| | Mol percent |
|---|---|
| $Fe_2O_3$ | 51.0–51.4 |
| $TiO_2$ | 1.0–1.3 |
| MnO | About 29 |

4. A manganese-zinc-ferrite core according to claim 1, with great thermal stability of the initial permeability over a range of operating temperatures of $+20°$ C.$\pm 50°$ C., characterized by the following limiting values:

| | Mol percent |
|---|---|
| $Fe_2O_3$ | 50–51.5 |
| $TiO_2$ | 1–3 |
| MnO | 27.5–29.5 |
| ZnO | 17.5–19.5 |

5. A manganese-zinc-ferrite core according to claim 4, characterized by the following limiting values:

| | Mol percent |
|---|---|
| $Fe_2O_3$ | 50.5–51.3 |
| $TiO_2$ | 1.5–2 |

6. A manganese-zinc-ferrite core according to claim 1, characterized by an initial permeability $\mu_a$ of at least 1000, a loss factor relative to the initial permeability in a measuring frequency of 100 kHz. of less than $\tan \delta/\mu_a=5$, an instability value relative to the initial permeability of less than $-i_z/\mu_a=5$ and a temperature coefficient of the initial permeability in a minimum range of operating temperatures of at least 40° of less than $TK/\mu_a=2.10^{-6}/°$ C.

7. A manganese-zinc-ferrite core according to claim 2, characterized by an initial permeability of more than 1500, a loss factor of less than $\tan \delta/\mu_a=2.5$, a time instability coefficient of less than $TK/\mu_a=1.10^{-6}/°$ C.

8. A manganese-zinc-ferrite core according to claim 3, characterized by initial permeability $\mu_a$ of more than 2500, a time instability value of less than $-i_z/\mu_a=1.5$ and a TK of less than $TK/\mu_a=\pm 0.2°/10^{-6}/°$ C.

9. A manganese-zinc-ferrite core according to claim 4, characterized by a time instability value of less than $-i_z/\mu_a=2$ and a TK of less than $TK/\mu_a=2.10^{-6}/°$ C. over an operating temperature range of $+20°$ C.$\pm 50°$ C.

10. A manganese-zinc-ferrite core according to claim 5, characterized by an initial $/\mu_a$ permeability of more than 2000 and a TK of less than $TK/\mu_a=10^{-6}/°$ C.

11. The process for producing ferromagnetic highly permeable manganese-zinc-titanium ferrite cores, comprising the steps of mixing oxides having a high degree of purity with less than 0.2% by weight impurities, as follows:

| | Mol percent |
|---|---|
| $Fe_2O_3$ | 49–51.6 |
| $TiO_2$ | 0.8–3 |
| MnO | 26–30.5 |
| ZnO | 17–22 | presintering said mixture at about 700 to 900° C., for about an hour, wetgrinding the presintered mixture with the addition of 0.05–0.2% by weight, CaO, present as CaO or a corresponding amount of $CaCO_3$, pressing the material to shape and sintering the same at 1100–1300 C. for one to four hours in a low-oxygen atmosphere having an oxygen content of not more than 5 vol. percent, and cooling the same in a predominately pure neutral atmosphere.

12. A process according to claim 11, wherein the sintered cores are again sintered to avoid as ilmenite separation.

13. A process according to claim 11, wherein the sintering is effected at temperatures between 1200 and 1280° and 1280° for two hours to obtain a small TK.

14. A process according to claim 11, wherein the sintering is effected at temperatures between 1100 and 1150° C. for one to two hours to obtain very small losses.

15. A process as defined in claim 11 wherein the cooling is effected at a velocity of about 200° C./h. to 500° C./h. until temperatures below 900° C. are reached.

16. A process as defined in claim 11 wherein the cooling is effected at a velocity of about 200° C./h. to 500° C./h. until temperatures below 900° C. are reached and then cooling is effected at a velocity of about 100° C./h. until temperatures of about 200° C. are reached.

References Cited
UNITED STATES PATENTS 3,106,534   10/1963   Akashi et al. _____ 252—62.59

TOBIAS F. LEVOW, Primary Examiner

R. D. EDMONDS, Assistant Examiner

U.S. Cl. X.R.

252—62.62, 62.63

UNITED STATES PATENT OFFICE
CERTIFICATE OF CORRECTION

Patent No. 3,567,641               Dated March 2, 1971

Inventor(s)   Erich Ross et al.

It is certified that error appears in the above-identified patent and that said Letters Patent are hereby corrected as shown below:

Column 2, line 27, "amount" should read -- amounts --. Column 3, line 63, "norrow" should read -- narrow --. Column line 29, "ferrites, mixed and produced in according to the invention," should read -- ferrites, mixed and produced according to the invention, --; Table 1, column 1, "$Fe_3O_3$" should read -- $Fe_2O_3$ --. Column 6, line 43, "$(TK/\mu_a \leq 0.4 \cdot 10^{-6}/$" should read -- $(TK/\mu_a \leq \pm 0.4 \cdot 10^{-6}/°C.)$ --. Column 8, line 66, "$\pm 0.2°/10^{-6}/°C.$" should read -- $\pm 0.2 \cdot 10^{-6}/°C.$ --; line 72, "initial / $\mu_a$" should read -- initial $\mu_a$ --. Column 9, line 1 "as" should read -- an --.

Signed and sealed this 15th day of February 1972.

(SEAL)
Attest:

EDWARD M. FLETCHER, JR.                ROBERT GOTTSCHALK
Attesting Officer                      Commissioner of Patents